United States Patent [19]

DeLeeuw et al.

[11] Patent Number: 4,492,368
[45] Date of Patent: Jan. 8, 1985

[54] FORCE APPLYING APPARATUS

[75] Inventors: Cornelius DeLeeuw; Thomas O. Blunt, both of Louisville, Ky.

[73] Assignee: General Electric Company, Louisville, Ky.

[21] Appl. No.: 513,441

[22] Filed: Jul. 13, 1983

[51] Int. Cl.³ .............................................. B29D 23/00
[52] U.S. Cl. ..................................... 269/32; 269/235; 74/107
[58] Field of Search ................... 74/107, 567, 570, 54; 264/45.1; 249/93; 425/110, 123, 817 R; 269/229, 232, 235, 236, 32, 48.1, 49

[56] References Cited

U.S. PATENT DOCUMENTS

| | | |
|---|---|---|
| Re. 27,593 | 3/1973 | Gondeck et al. . |
| 2,782,819 | 2/1957 | Levy ..................................... 269/235 |
| 3,155,751 | 11/1964 | Morris . |
| 3,177,271 | 4/1965 | Slayman . |
| 3,265,783 | 8/1966 | Jacobs . |
| 3,265,784 | 8/1966 | Jacobs . |
| 3,298,656 | 1/1967 | Zastrow . |
| 3,310,616 | 3/1967 | Beary . |
| 3,353,782 | 11/1967 | Zastrow . |
| 3,503,602 | 3/1970 | Waara ................................ 269/235 |
| 3,801,059 | 4/1974 | Lippold . |
| 3,877,856 | 4/1975 | Valentini . |
| 3,880,415 | 4/1975 | Fujioka et al. . |
| 4,252,293 | 2/1981 | Daley . |
| 4,370,795 | 2/1983 | Reidenbach . |

Primary Examiner—Robert C. Watson
Attorney, Agent, or Firm—Frederick P. Weidner; Radford M. Reams

[57] ABSTRACT

Apparatus for applying force in one direction to an article and restraining movement of the article in the opposite direction. There is provided a reciprocally rotatable link and means to rotate the link connected to a first end of the link and a cam shaft having a first and second cylindrical portion, said first cylindrical portion having a different central axis of rotation than the second cylindrical portion. The first cylindrical portion of the cam shaft is secured to the end of the link opposite the end connected to the rotating means to provide rotational movement of the cam shaft when the link is rotated. A mounting block with a bore therethrough has the first cylindrical portion of the cam shaft passing through the bore. A rotating member pivotal at one end and movable from a first position to a second position has the second cylindrical portion of the cam shaft rotatably secured thereto at the end opposite from the pivotal end. With this arrangement of the apparatus components, rotation of the rotating member from the first position to the second position moves the mounting block in the direction of the article a certain predetermined distance and rotation of the link rotates the cam shaft about the axis of the second cylindrical portion and the eccentric rotation of the first cylindrical portion through the mounting block causes the mounting block to exert mechanical force against the article in the direction of the article. With this arrangement, the article is also restrained from movement in the direction opposite from the direction of the applied force.

11 Claims, 7 Drawing Figures

FORCE APPLYING APPARATUS

BACKGROUND OF THE INVENTION

This invention relates to an apparatus for applying force in one direction to an article and restraining movement of the article in the opposite direction. More specifically the apparatus is useful in the manufacture of refrigerators and particularly in the insulation foaming operation of refrigerator cabinets.

It has been recognized that certain foam resins permanently containing in their cells vapors having a low co-efficient of heat transmission provide superior insulating qualities to refrigerator and freezer cabinets. Refrigerator and freezers normally employ a sheet metal outer casing and either a sheet metal or plastic inner liner with an insulation medium interposed therebetween. Polyurethane compositions in liquid/gas form are introduced into the space between the outer casing and inner liner, expand throughout the space and then are solidified by curing. The pressures generated during the foaming operation require strong, heavy, expensive molds and fixtures to keep the refrigerator or freezer cabinet in its desired shape. These fixtures include a main frame with side gates that are movable in and out to prevent the side walls of the outer casing of the cabinet from being bulged or bowed outwardly during the foaming operation. The outer metal cabinet casing is usually prepainted and therefore it is important that the side gates which are to prevent bowing of the outer casing must be moved in a direction perpendicular to the surface of the article that it is to restrain so that the painted finish is not subject to abrasion, scratching, etc., by the side gates.

In the manufacture of refrigerator and freezer cabinets the outer metal casing is often subject to variation in tolerance which can be substantial enough that even though the side gates perform their proper operation, they do not allow for the variance in tolerance and therefore on many occasions during the foaming operation the outer casing of the cabinet is still permitted to bow outwardly until it is restrained by the side gate. One solution to the foaming process causing the outer casing to bow is to increase the amount of curing time that the refrigerator or freezer cabinet is subjected to in the fixture during the foaming process. This, however, is very expensive as it requires additional fixtures to be able to produce the same number of refrigerator cabinets foamed with shorter curing times. It is advantageous from the standpoint of minimizing the number of fixtures necessary for an assembly line and to minimize the amount of curing time per refrigerator cabinet that there be a means that allows shorter curing time yet prevents bowing of the refrigerator outer case due to manufacturing tolerance deviations of the outer casing.

By this invention there is provided apparatus that will accomplish the above-mentioned desirable results.

SUMMARY OF THE INVENTION

The invention provides apparatus for applying force in one direction to an article and restraining movement of the article in the opposite direction. The apparatus includes a reciprocally rotatable link having a first and second end and means to rotate the link connected to the first end of the link and a cam shaft having a first and second cylindrical portion, said first cylindrical portion having a different central axis of rotation than the second cylindrical portion, said first cylindrical portion of the cam shaft being secured to the end of the link opposite the end connected to the rotating means to provide rotational movement of the cam shaft when the link is rotated. A mounting block with a bore therethrough has the first cylindrical portion of the cam shaft passing through the bore. There is provided a rotating member pivotal at one end and movable from a first position to a second position and having the second cylindrical portion of the cam shaft rotatably secured at the end opposite from the pivotal end. With this arrangement rotation of the member from the first position to the second position moves the mounting block in the direction of the article a certain predetermined distance and rotation of the link rotates the cam shaft about the axis of the second cylindrical portion and the eccentric rotation of the first cylindrical portion through the mounting block causes the mounting block to exert mechanical force against the article in the direction of the article. With this arrangement, the article is also restrained from movement in the opposite direction of the applied force.

DESCRIPTION OF THE PREFERRED EMBODIMENT

Figure 1:
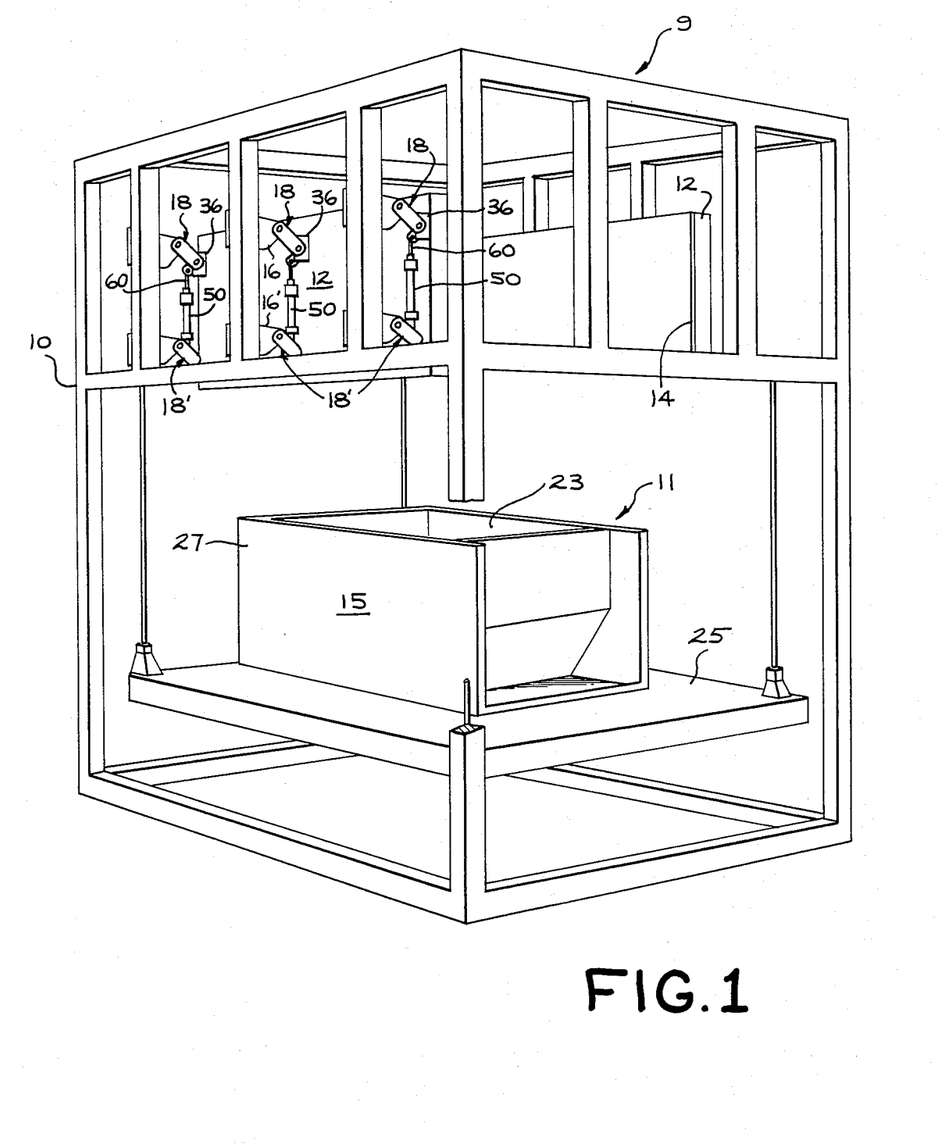
FIG. 1 is a diagrammatical view of a refrigeration cabinet foaming fixture embodying the present invention.

Referring to FIG. 1 there is shown diagrammatically a portion of a refrigerator cabinet foaming fixture 9 which includes a main frame 10 and two side gates 12 one on each side of the fixture which are movable in and out with a flat plate 14 attached to each to bear against the sides of the outer casing 15 of a refrigerator cabinet 11 and restrain them from bulging or bowing outwardly during the foaming process. The entire refrigerator cabinet foaming fixture is not shown and will not be described in detail as its operation does not form part of this invention. However, the invention has been found useful in foaming fixtures. The invention is useful in all types of apparatus wherein it is desired to exert force against an article, in the case of the preferred embodiment the outer casing 15 of a refrigerator cabinet 11, in one direction and restrain movement of the article in the opposite direction.

As shown in FIG. 1, the refrigerator cabinet foaming fixture 9 has a main frame 10 that accepts at the bottom thereof a refrigerator cabinet 11 having an outer casing 15 made from sheet metal and usually prepainted. The cabinet 11 also has an inner plastic liner 23 to be held firmly within and spaced from the outer casing 15. The cabinet foaming fixture 9 is to hold the outer casing 15 and inner liner 23 in position and introduce in the space between them foam material which will expand by gas pressure and fill all of the voids between the outer casing 15 and inner liner 23. After a period of time the foaming material will be cured and hardened in place to form the insulation and also to structurally support the plastic liner and outer sheet metal casing. It is during the curing stage that the foam generates high pressure gas which can bow the outer casing 15 or inner liner 23 without adequate restraining structures. After the refrigerator cabinet 11 is introduced into the bottom of the cabinet foaming fixture 9 as shown in FIG. 1, a platform 25 and the cabinet 11 are carried upwards by an appropriate mechanism. When the refrigerator cabinet 11 is at the top of the cabinet foaming fixture 9, the inside plastic liner is supported against inward collapse by an appropriate plug (not shown) and the side walls 27 of the outer casing 15 of the cabinet are supported against bulging outwardly by the side gates 12, one on each side of the fixture. The side gates 12 each carry smooth flat plates 14 which are essentially the same size as the side walls of a refrigerator so that the side walls are supported throughout a substantial amount of their respective areas.

It will be understood that when the refrigerator cabinet 11 is raised from the lower portion of the cabinet foaming fixture 9 to the upper portion there needs to be clearance around the outer casing 15 and the side gates so that the prepainted side walls of the refrigerator outer cabinet are not marred or scratched. Prior to the foaming operation this clearance needs to be taken up so that the side walls of the outer casing 15 are supported by the plates 14 to prevent bowing of the side walls during the foaming operation.

Figure 2:
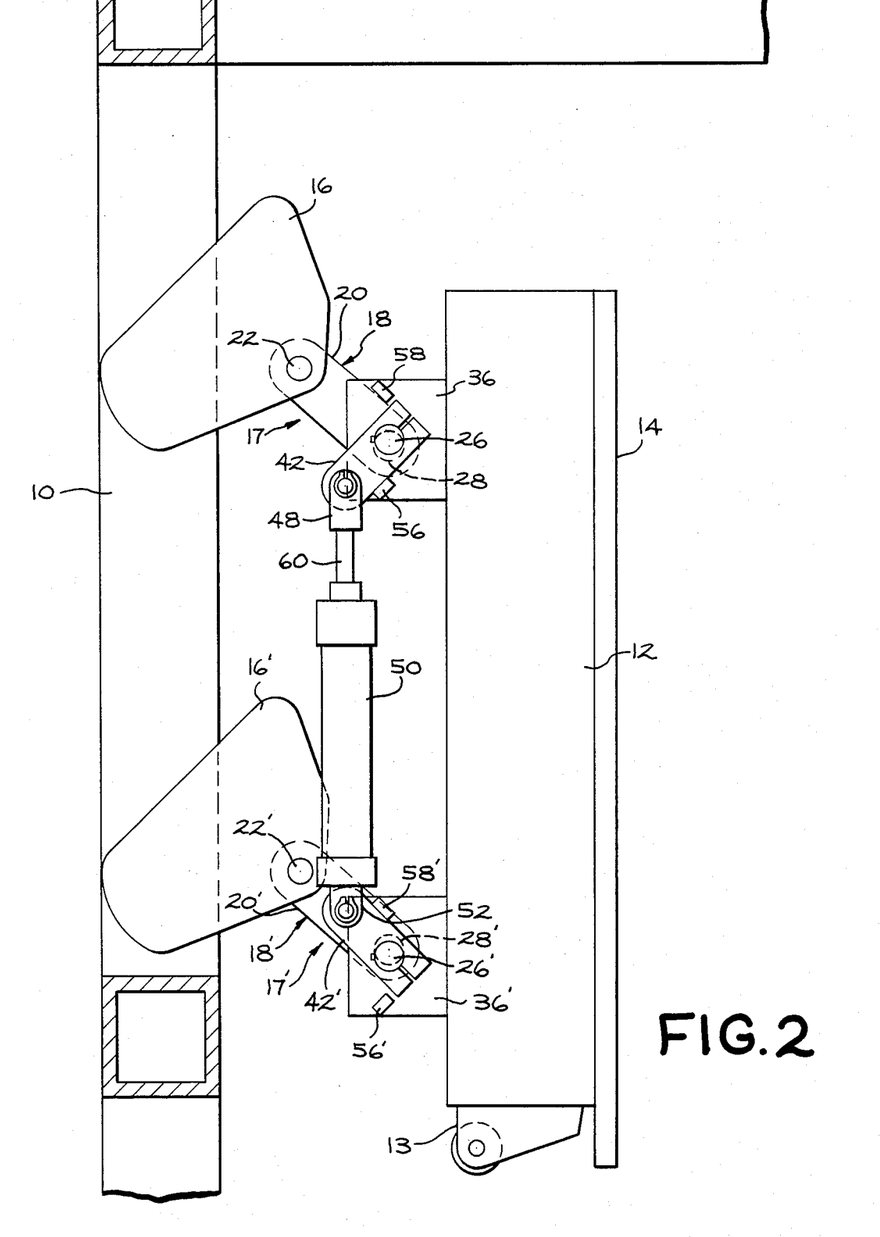
FIG. 2 is a side elevational view of a portion of a refrigerator cabinet foaming fixture embodying the present invention showing a first position of the apparatus.

Both sides of the foamed fixture 9 mechanically operate in the identical fashion to support the side walls 27 of the outer casing 15 so only one side showing the operation of the mechanism will be discussed. As can be seen in FIG. 2, the preferred embodiment utilizes an upper assembly 17 and a lower assembly 17' of the components of this apparatus which assemblies have the same fundamental structural arrangement. Accordingly, only one assembly and its components and operation will be discussed with corresponding elements in the other assembly being identified by the prime numbers.

With reference to FIG. 2 the apparatus of this invention used in a refrigerator cabinet foaming fixture 9 is shown in a first position where the apparatus is ready to receive the refrigerator cabinet 11 for the foaming operation. The side gate 12 is in a position to allow clearance for movement of the refrigerator cabinet 11 up to the upper portion of the fixture and positioned between the flat plates 14. When the refrigerator cabinet 11 is moved upwardly the bottom 13 of the side gate 12 is engaged mechanically and is moved upwardly by mechanical force. The main frame 10 has securely mounted to it in a fixed position stationary supports 16 to which are pivotally connected a rotating member 18 which may be rotated from the position shown in FIG. 2 to a horizontal position shown in FIG. 4. For this purpose one end 20 of the rotating member 18 is pivotally attached at 22 to the stationary supports 16 to allow up and down movement about the pivot point. It will be understood that when the rotating member 18 is in the position shown in FIG. 2, the side gate 12 and flat plate 14 is retracted away from the refrigerator cabinet and when the side gate 12 and flat plate 14 is moved upwardly the rotating member 18 rotates about the pivot 22 and when it reaches the horizontal position shown in FIG. 4, the side gate 12 carrying flat plate 14 is moved a predetermined distance toward the side walls 27 of the refrigerator cabinet. Heretofore in refrigerator cabinet foaming fixtures the rotating member 18 was connected directly to the side gate 12 and the components were dimensioned so that the side gate 12 carrying flat plate 14 would be in very close proximity to the side walls 27 of the outer case 15 of the refrigerator cabinet. However, due to manufacturing tolerance variance, it was possible that the flat plate 14 would not engage the side wall 27 of the outer case 15 of the refrigerator cabinet but would be spaced a slight distance away and as a result during the foaming operation the force generated by the expanding foam would exert force on the outer casing until it contacted the flat plate 14 thus causing the casing to bow and remain bowed when the foam hardened by curing. To compensate for the variance in cabinet outer casing tolerance, there is provided the mechanical arrangement of components of the apparatus shown in FIG. 3, which is the upper assembly 17.

Figure 3:
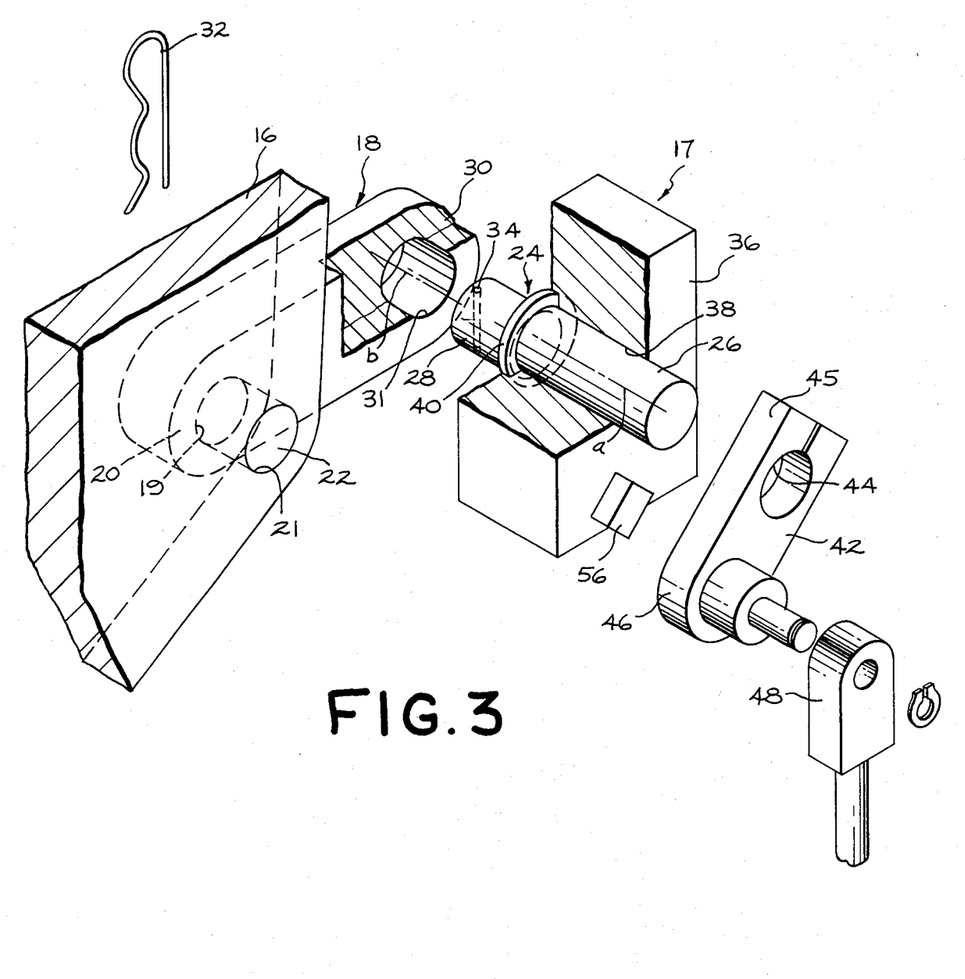
FIG. 3 is an exploded perspective view of a portion of the apparatus embodying the present invention.

As shown in FIG. 3, the stationary support 16 has a bore 21 that accepts a pivot 22 for pivotally attaching to it, as described above, the end 20 of rotating member 18 through a bore 19. At a right angle to the rotating member 18 is a cam shaft 24 having a first cylindrical portion 26 and a second cylindrical portion 28 each having a different central axis of rotation designated as "a" and "b" respectively. The rotating member 18 has the second cylindrical portion 28 rotatably secured in a bore 31 at the end 30 which is opposite from the pivotal end 20 of the rotating member 18. The second cylindrical portion 28 of the cam shaft 24 is free to rotate in the bore 31 but is retained secured to the rotating member by a pin 32 that passes through a pin hole 34 in the second cylindrical portion which protrudes slightly through the bore 19 to receive the pin 32.

Securely attached to and movable with the side gate 12 is a mounting block 36 through which is a bore 38 that receives and retains in rotational movement the first cylindrical portion 26 of the cam shaft 24. To help position the cam shaft 24 in the mounting block 36 there is a circumferential retainer collar 40 that also acts as a bearing surface for the first cylindrical portion 26. The end of the first cylindrical portion 26 opposite from the second cylindrical portion 28 is secured to a link 42. The first cylindrical portion 26 passes through an opening 44 in end 45 of link 42 and is keyed or otherwise secured to the link so that rotational movement of link 42 will also rotate the cam shaft 24. The opposite end 46 of the link 42 from the end 45 attached to the cam shaft is secured to a means to rotate the link which in the preferred embodiment is a pneumatic air cylinder 50.

Figure 4:
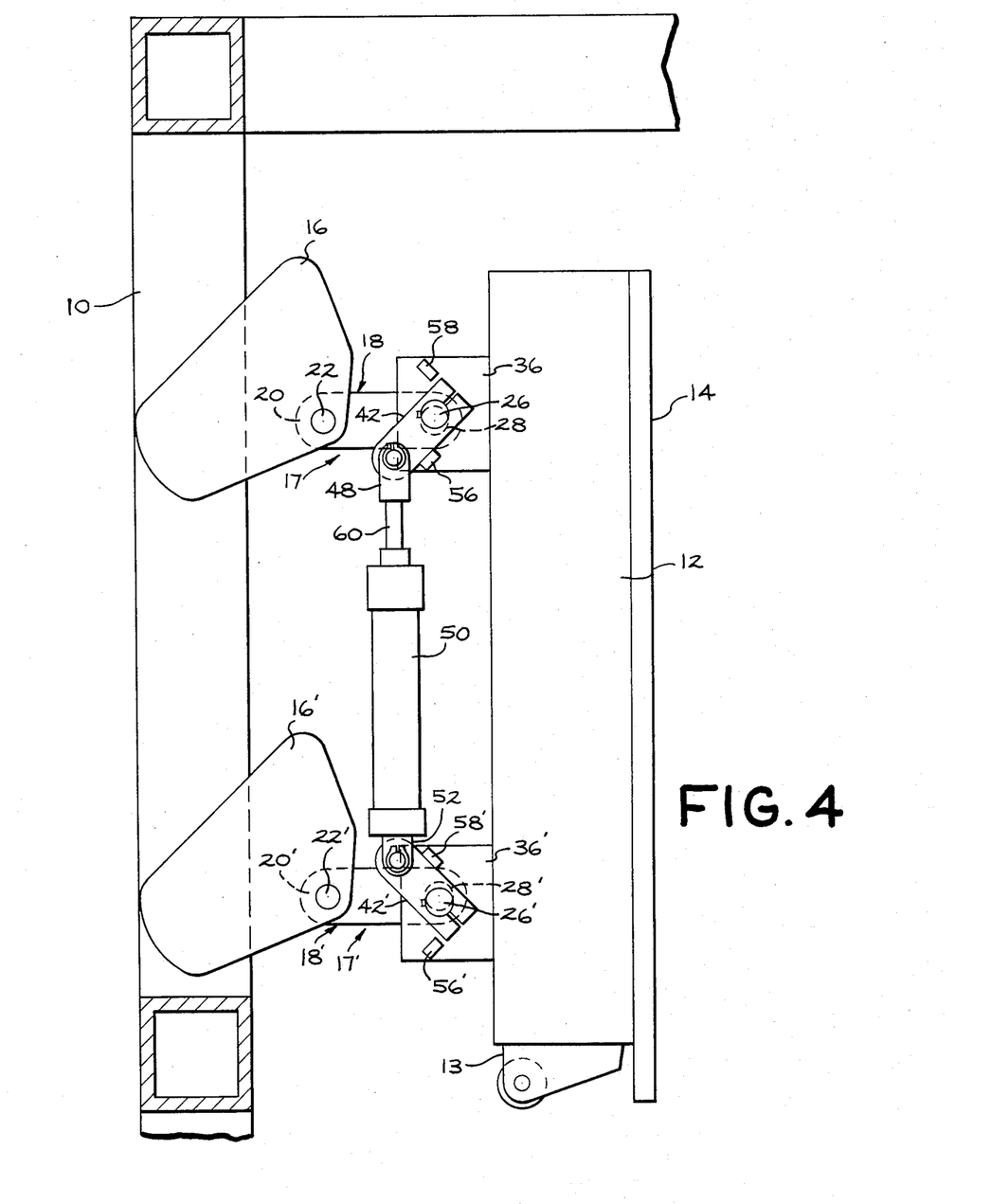
FIG. 4 is a side elevational view of a portion of a refrigerator cabinet foaming fixture similar to FIG. 2 embodying the invention and showing a second position of the apparatus.
Figure 5:
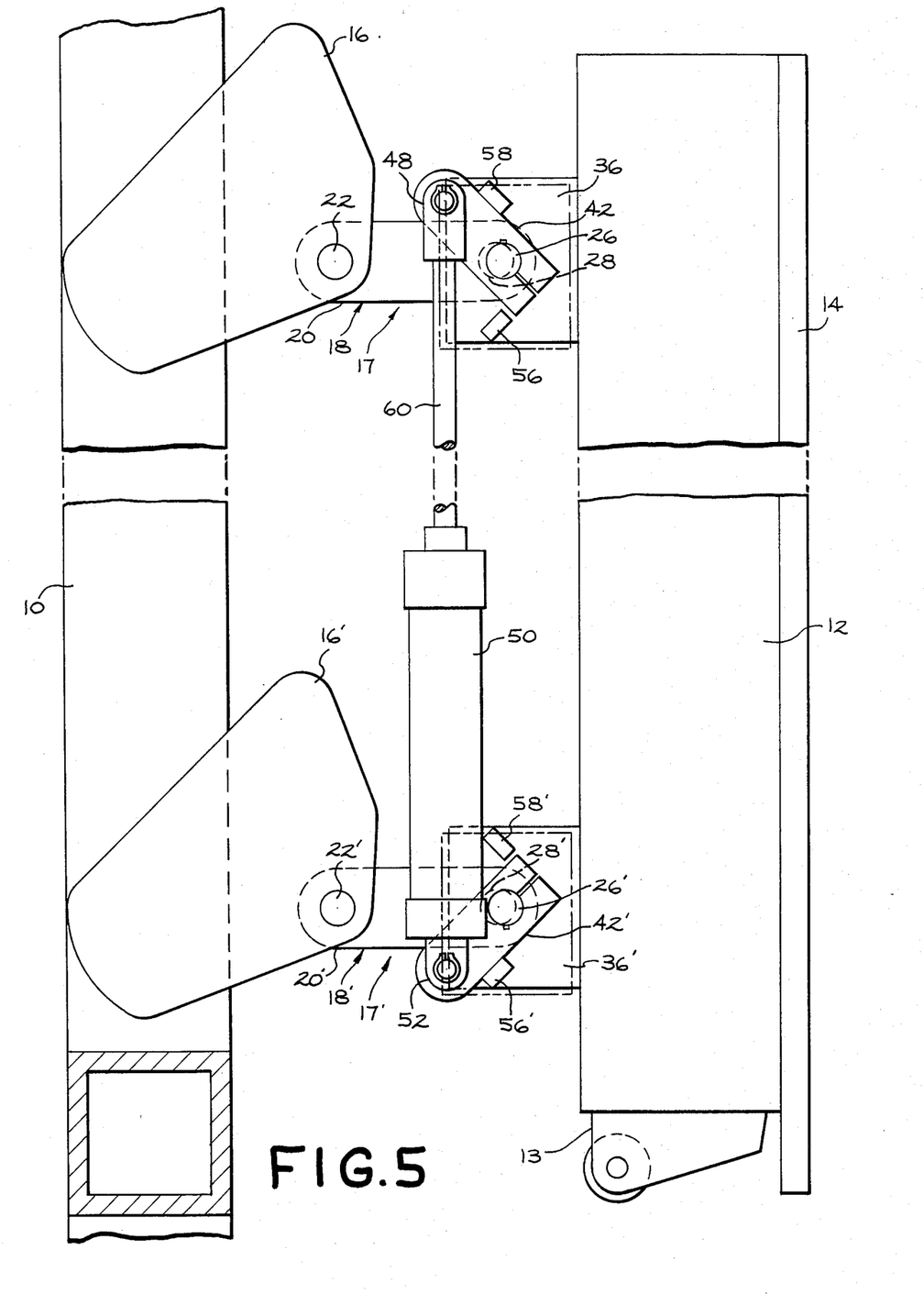
FIG. 5 is a side elevational view broken and shows in larger scale a portion of a refrigerator cabinet foaming fixture similar to FIGS. 2 and 4 embodying the invention and showing a third position of the apparatus.

With reference to FIGS. 2, 4 and 5, it can be seen that there are two such assemblies 17 and 17' which are interconnected by the air cylinder 50, each having the mechanical arrangement of the apparatus described above in connection with FIG. 3. One end 48, which is the piston end, of the air cylinder 50 is connected to, in this case, link 42 of upper assembly 17 and the opposite end 52 of the air cylinder 50 is connected to link 42' of the lower assembly 17'. It will also be noted that the arrangement of the two assemblies 17 and 17' is such that the links 42 and 42' are rotated in opposite directions in response to extending the distance between the ends 48 and 52 of the air cylinder 50 as by the introduction of pressurized air into the air cylinder. The air cylinder 50 is arranged as shown in the figures and mounted to respond to reactive force to extend the distance between the ends 48 and 52 of the air cylinder 50 when air is introduced into the cylinder.

Figure 6:
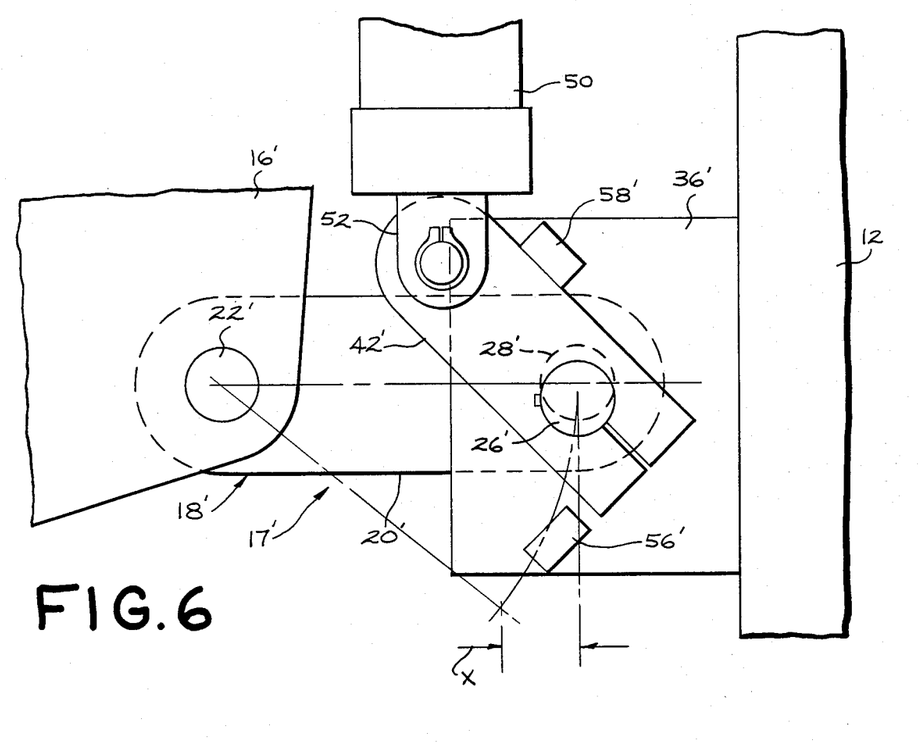
FIG. 6 is an enlarged side elevational view of portions of a refrigerator cabinet foaming fixture embodying the present invention and showing relative movement of the components of the apparatus in a position prior to applying force to an article.

During the foaming operation when the refrigerator cabinet 11 is in the upper portion of the refrigerator cabinet foaming fixture 9, the force applying apparatus of this invention is in the position shown in FIGS. 4 and 6. In that position the center of pivot 22 of the rotating member 18 and the center of bore 31 and central axis "b" of the second cylindrical portion 18 of cam shaft 24 are in the same plane and that plane is perpendicular to the side gate 12 and the cabinet side wall 27 it is to support. Once that position is reached, the controls for the foaming fixture 9 signal a mechanism to introduce pressurized air into the air cylinder 50 and the distance between the ends of the air cylinder is extended thus rotating the links 42 and 42' in a direction away from the air cylinder and upon rotation of the links the respective cam shafts 24 and 24' keyed to the respective links 42 and 42' are also rotated. This rotation is about the central axis "b" of the second cylindrical portion 28 which is rotatably secured to the rotating member 18. Upon rotation of the cam shaft 24 about that axis, the central axis "a" of the first cylindrical portion 26 is rotated eccentrically and as a result of that rotation it forces the mounting block 36 in a direction toward the side wall 27 of the refrigerator cabinet 11 carrying with it the attached side gate 12 and plate 14 until the plate 14 engages the side wall 27 of the refrigerator cabinet 11. The air pressure introduced into the air cylinder 50 thus rotates the links 42 and 42' each of which exerts or applies force through the mechanism in the direction of the refrigerator cabinet 11 until the position of the mechanism is reached as shown in FIG. 5. To prevent excessive rotation of the links 42 and 42' there are stops 56 and 56' against which the links will abut when the distance between the ends of the air cylinder 50 is extended and stops 58 and 58' when the air cylinder ends are retracted.

Figure 7:
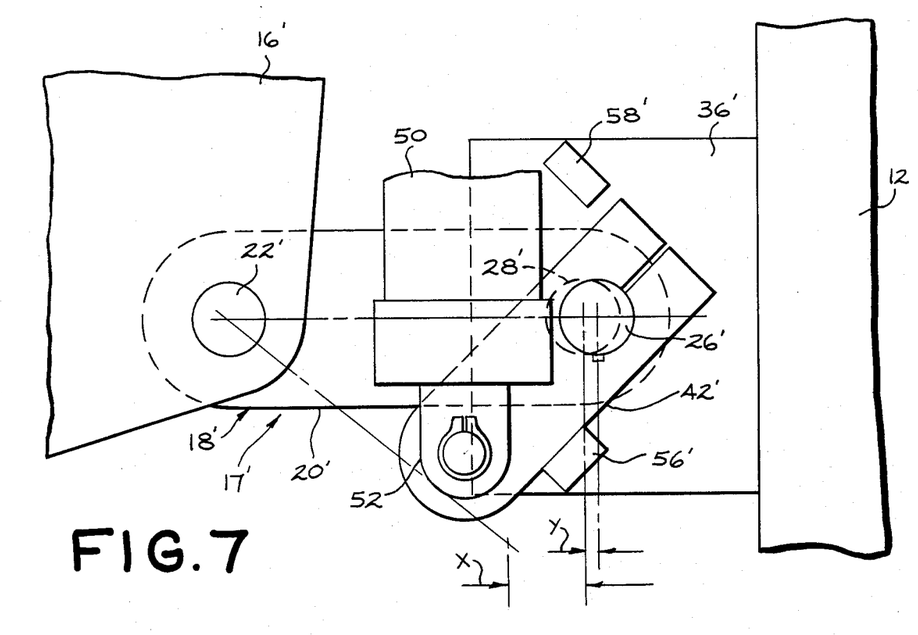
FIG. 7 is an enlarged side elevational view of portions of a refrigerator cabinet foaming fixture similar to FIG. 6 and showing the position of the components of the apparatus while applying force to an article.

As can be seen most clearly in FIGS. 6 and 7, the apparatus causes the side gate 12 to move to the right a slight distance in a direction perpendicular to the side wall 27 of the refrigerator cabinet 11 that it is to support during the foaming operation. By moving perpendicular to the side wall 27 it prevents the cabinet 11 from being marred or scratched when it is contacted by the flat plate 14 carried by side gate 12. In addition, with this arrangement the amount of pressure introduced into the cylinder 50 should be sufficient to force the flat plate 14 against the side of the refrigerator cabinet but not excessive to cause the side wall 27 to be deformed upon engagement thereof. FIGS. 6 and 7 show the lower assembly 17' with the position of the components of the assembly similar to that of FIG. 4 prior to the apparatus exerting force against the article or refrigerator cabinet 11. The rotation of member 18 from its position shown in FIG. 2 to the horizontal position shown in FIG. 4 moves the central axis of rotation "a" of the second cylindrical portion 28 and the mounting block 36 toward the side wall 27 a distance indicated as "x" in FIGS. 6 and 7. Rotation of link 42 and the eccentric rotation of the central axis of rotation "b" of the first cylindrical portion 26 moves the mounting block a distance designated "y" in FIG. 7 assuming maximum variation in outer casing tolerance. It will be noted in FIG. 6 that the center of pivot 22 of the rotating member 18 and the center of bore 31 and the central axis "b" of the second cylindrical portion 28 of cam shaft 24 are in the same plane designated "p" and that plane is perpendicular to side gate 12 and the article being supported by the side gate and flat plate 14. The axis of rotation of the first cylindrical portion 26 designated "a" does not lie in that same plane. When the reactive force acting on the air cylinder causes link 42' to be rotated downwardly or in a counterclockwise direction as viewed in FIGS. 6 and 7, the link is dimensioned so that when it is rotated to the position shown in FIG. 7 the axis of central rotation "a" of the first cylindrical portion 26 is rotated in a direction as shown by the arrow and now lies in the same plane "p." With this movement the side gate 12 through this mechanism is moved or urged against the side wall 27 of the cabinet thus taking up any variation in tolerance due to the manufacturing processes of the outer casing 15 of the refrigerator cabinet. Once the apparatus is in the position shown in FIG. 7, the foamed insulation material is introduced into the space between the inner liner 23 and outer casing 15 and the foaming operation takes place. The outer casing side walls 27 are prevented from bowing outwardly because the side gate 12 and flat plate 14 prevent any bowing. Force generated by the foaming operation to bow out the side wall of the refrigerator outer casing is prevented because the rotating member pivot point and the central axis of rotation of the second cylindrical portion of the cam shaft are in the same plane and perpendicular to the side wall of the refrigerator outer casing.

After the foam insulation has been adequately cured for a period of time the foaming fixture controls signal termination of air pressure to the air cylinder 50 and the distance between the ends 48 and 52 is retracted by biasing means and the apparatus assumes the position shown in FIG. 4. The biasing means in the case of the preferred embodiment is a spring inside the air cylinder 50 which is compressed upon movement of the piston rod 60 to extend the ends 48 and 52. Termination of the air pressure allows the spring to contract and move the piston rod 60 back into the body of the air cylinder 50. Movement of the side gate 12 downwardly when the platform 25 is lowered positions the apparatus as shown in FIG. 2 and is ready to receive the next refrigerator cabinet for the foaming operation.

What has been described above is the preferred embodiment of the force applying apparatus of this invention in which two such assemblies are utilized with the respective ends of a pneumatic air cylinder 50 connected to each for rotating the respective links. It will be understood that one such assembly may be utilized to apply force to an article and in that case the end of the air cylinder 50 opposite from the end connected to the link 42 would be secured to some stationary member so that it is responsive to reactive force to rotate the link upon extension of the distance between the ends of the air cylinder by the introduction of pressurized air into the cylinder.

While a specific embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. Apparatus for applying force in one direction to an article and restraining movement of the article in the opposite direction comprising:
    a reciprocally rotatable link having a first and second end,
    means to rotate the link connected to the first end of the link,
    a cam shaft having a first and second cylindrical portion, said first cylindrical portion having a different central axis of rotation than the second cylindrical portion, said first cylindrical portion of the cam shaft being secured to the end of the link at the end of the link opposite the end connected to the rotating means to provide rotational movement of the cam shaft when the link is rotated,
    a mounting block having a bore therethrough and the first cylindrical portion of the cam shaft passes through the bore,
    a rotating member pivotal at one end and movable from a first position to a second position and having the second cylindrical portion of the cam shaft rotatably secured at the end opposite from the pivotal end,
    whereby rotation of the member from the first position to the second position moves the mounting block in the direction of the article, and rotation of the link rotates the cam shaft about the axis of the second cylindrical portion and the eccentric rotation of the first cylindrical portion through the mounting block causes the mounting block to exert mechanical force against the article in the direction of the article.

2. The apparatus of claim 1 wherein the means to rotate the link is a pneumatic cylinder having two opposite ends and mounted to respond to reactive force to extend the distance between the ends by the introduction of pressurized air into the cylinder and one end of the cylinder is connected to the link.

3. The apparatus of claim 1 wherein the mounting block is adjacent the link.

4. The apparatus of claim 1 wherein in the second position of the rotating member the pivot point and the central axis of rotation of the second cylindrical portion of the cam shaft are in the same plane.

5. The apparatus of claim 4 wherein the plane is perpendicular to the article.

6. Apparatus for applying mechanical pressure in one direction to an article then restraining movement of the article in the opposite direction comprising:
    two reciprocally rotatable links, each having a first and second end and said links being rotatable in opposite directions from each other,
    means to rotate the links connected to each of the first ends of the links,
    two cam shafts, each having a first and second cylindrical portion, each first cylindrical portion having a different central axis of rotation than the second cylindrical portion, said first cylindrical portion of each cam shaft being secured to the respective ends of the links at the end of the links opposite the ends connected to the rotating means to provide rotational movement of the respective cam shaft when the respective links are rotated,
    two mounting blocks, each having a bore therethrough and the first cylindrical portion of each respective cam shaft passes through each respective bore,
    two members, each having the respective second cylindrical portion of each cam shaft rotatably secured thereto,
    whereby rotation of the links rotates the respective cam shafts about the axis of the second cylindrical portion and the eccentric rotation of the first cylindrical portion through the mounting blocks causes the mounting blocks to exert mechanical force against the article in the direction of the article.

7. The apparatus of claim 6 wherein the means to rotate the links is a pneumatic cylinder having two opposite ends and mounted to respond to reactive force to extend the distance between the ends by the introduction of pressurized air into the cylinder and each end of the cylinder is connected to a link.

8. The apparatus of claim 6 wherein each mounting block is adjacent each respective link.

9. The apparatus of claim 6 wherein the two members rotate and are pivotal at one end and movable from a first position to a second position.

10. The apparatus of claim 9 wherein in the second position of the rotating member the pivot point and the central axis of rotation of the second cylindrical portion of the cam shaft are in the same plane.

11. The apparatus of claim 10 wherein the plane is perpendicular to the article.

* * * * *